United States Patent
Espeleta

(10) Patent No.: US 12,450,997 B2
(45) Date of Patent: Oct. 21, 2025

(54) METHODS AND SYSTEMS FOR MONITORING FOR FAULTY CONNECTOR RECEIVER MODULES OF MEDIA PLAYBACK DEVICES IN A TRANSPORTATION VEHICLE

(71) Applicant: Panasonic Avionics Corporation, Irvine, CA (US)

(72) Inventor: Gerald Espeleta, Irvine, CA (US)

(73) Assignee: PANASONIC AVIONICS CORPORATION, Irvine, CA (US)

( * ) Notice: Subject to any disclaimer, the term of this patent is extended or adjusted under 35 U.S.C. 154(b) by 216 days.

(21) Appl. No.: 18/376,747

(22) Filed: Oct. 4, 2023

(65) Prior Publication Data

US 2025/0118190 A1 Apr. 10, 2025

(51) Int. Cl.
*G08B 21/18* (2006.01)
*H04L 67/12* (2022.01)

(52) U.S. Cl.
CPC ......... *G08B 21/185* (2013.01); *G08B 21/182* (2013.01); *H04L 67/12* (2013.01)

(58) Field of Classification Search
CPC ...... G08B 21/185; G08B 21/182; H04L 67/12
See application file for complete search history.

(56) References Cited

U.S. PATENT DOCUMENTS

| | | | | |
|---|---|---|---|---|
| 5,036,479 A * | 7/1991 | Prednis | ................ | G01D 18/00 714/732 |
| 5,745,159 A * | 4/1998 | Wax | ................ | H04H 20/62 725/77 |
| 5,939,997 A * | 8/1999 | Sekine | ................ | G06F 13/4086 370/257 |
| 6,918,134 B1 * | 7/2005 | Sherlock | ................ | B64D 11/0015 348/837 |
| 7,009,601 B1 * | 3/2006 | Sherlock | ................ | G09G 5/006 332/149 |
| 7,344,102 B1 * | 3/2008 | Royer | ................ | B65H 75/486 267/284 |
| 8,082,569 B2 * | 12/2011 | Brady, Jr. | ................ | H04L 69/40 725/77 |
| 8,659,990 B2 * | 2/2014 | Petrisor | ................ | H04N 21/2221 370/242 |
| 8,935,040 B2 * | 1/2015 | Julson | ................ | H04L 41/0677 701/32.1 |
| 9,118,547 B2 * | 8/2015 | Petrisor | ................ | H04L 12/40182 |
| 9,276,807 B2 * | 3/2016 | Nasir | ................ | H04L 41/0668 |

(Continued)

*Primary Examiner* — Hoi C Lau
(74) *Attorney, Agent, or Firm* — LOZA & LOZA, LLP

(57) ABSTRACT

Methods and systems are provided for a transportation vehicle. One method includes determining whether a connector receiver module is electrically connected to a connector of a media output device during a maintenance mode, measuring a load parameter at the connector receiver module in response to determining that the connector receiver module is electrically connected to the connector, the load parameter being associated with an electrical load at the connector receiver module, determining whether the load parameter is below a load threshold, and reporting a maintenance indicator indicating a location of the media playback device, the maintenance indicator being based on at least one of determining that the connector receiver module is electrically connected to the connector or determining that the load parameter is below the load threshold.

20 Claims, 9 Drawing Sheets

(56) References Cited

U.S. PATENT DOCUMENTS

| | | | |
|---|---|---|---|
| 9,310,415 B2* | 4/2016 | Henkel | G01R 31/69 |
| 9,532,082 B2* | 12/2016 | Petrisor | H04L 12/437 |
| 9,864,559 B2 | 1/2018 | Sizelove | |
| 10,084,810 B2 | 9/2018 | Watson et al. | |
| 10,708,630 B1* | 7/2020 | Pham | H04N 21/4425 |
| 10,728,587 B2* | 7/2020 | Braun | H04N 21/41422 |
| 10,924,770 B2* | 2/2021 | Braun | H04N 21/23103 |
| 11,021,269 B2* | 6/2021 | Fagan | B64D 11/00155 |
| 11,044,177 B2* | 6/2021 | Watson | H04L 67/12 |
| 11,077,945 B2 | 8/2021 | Kim et al. | |
| 11,202,106 B2* | 12/2021 | Braun | H04N 21/2407 |
| 11,319,071 B2* | 5/2022 | Morales Anton | B64D 11/00152 |
| 11,409,649 B2* | 8/2022 | Braun | G06F 13/4081 |
| 11,442,095 B2* | 9/2022 | Hülsen | G01R 31/008 |
| 11,495,062 B2* | 11/2022 | Shu-Zhong Cabos | B64F 5/40 |
| 11,620,294 B2* | 4/2023 | Sheriff | H04H 20/62 707/748 |
| 12,208,899 B2* | 1/2025 | Vazquez | B64D 11/00152 |
| 12,267,546 B2* | 4/2025 | Malhotra | H04W 4/48 |
| 2006/0174285 A1* | 8/2006 | Brady, Jr. | H04N 21/2146 725/78 |
| 2006/0179457 A1* | 8/2006 | Brady, Jr. | H04N 7/18 725/75 |
| 2006/0293190 A1* | 12/2006 | Watson | H04L 45/28 505/126 |
| 2010/0115326 A1* | 5/2010 | Westeroth | H04L 67/00 714/E11.071 |
| 2010/0262391 A1* | 10/2010 | Sauermann | G01R 31/68 702/58 |
| 2011/0003505 A1* | 1/2011 | Greig | B64D 11/0015 439/527 |
| 2011/0107377 A1* | 5/2011 | Petrisor | H04L 41/0668 725/76 |
| 2011/0189863 A1* | 8/2011 | Sare | H01R 13/6205 439/39 |
| 2013/0187661 A1* | 7/2013 | Henkel | G01R 31/69 324/503 |
| 2014/0269262 A1* | 9/2014 | Petrisor | H04B 10/038 725/76 |
| 2015/0109903 A1* | 4/2015 | Nasir | H04L 41/0668 370/221 |
| 2015/0341677 A1* | 11/2015 | Petrisor | H04N 21/2146 725/76 |
| 2016/0006185 A1* | 1/2016 | Greig | H01R 13/665 439/620.21 |
| 2016/0134899 A1* | 5/2016 | Petrisor | H04N 21/2146 725/76 |
| 2016/0248831 A1* | 8/2016 | Watson | H04L 65/612 |
| 2019/0100152 A1 | 4/2019 | Shastry | |
| 2019/0227922 A1* | 7/2019 | Braun | G06F 3/0658 |
| 2019/0379915 A1* | 12/2019 | Braun | G06F 16/182 |
| 2019/0379918 A1* | 12/2019 | Braun | H04N 21/2407 |
| 2020/0064387 A1* | 2/2020 | Hülsen | G01R 31/58 |
| 2020/0204464 A1* | 6/2020 | Watson | H04L 67/025 |
| 2020/0324903 A1* | 10/2020 | Morales Anton | B64D 11/00155 |
| 2020/0336773 A1* | 10/2020 | Braun | H04N 21/2393 |
| 2021/0240723 A1* | 8/2021 | Sheriff | H04N 21/472 |
| 2023/0365259 A1* | 11/2023 | Vazquez | B64D 11/00152 |
| 2024/0276051 A1* | 8/2024 | Malhotra | H04N 21/41422 |
| 2025/0118190 A1* | 4/2025 | Espeleta | G01R 31/69 |

* cited by examiner

| Seat Location | Report Indication | Recommendation |
|---|---|---|
| 1F | ⊗ | Check if headset connector remains in audio plug |
| 6B | ● | Failure + replace |
| 11D | ⊗ | Check if headset connector remains in audio plug |
| 16A | ● | Failure + replace |
| 16F | ● | Failure + replace |
| 18C | ● | Failure + replace |
| 20D | ⊗ | Check if headset connector remains in audio plug |

⊗ Warning Indicator
● Failure Indicator

FIG. 3C

METHODS AND SYSTEMS FOR MONITORING FOR FAULTY CONNECTOR RECEIVER MODULES OF MEDIA PLAYBACK DEVICES IN A TRANSPORTATION VEHICLE

TECHNICAL FIELD

The present disclosure relates to transportation vehicles in general, and more particularly, to technology for detecting faulty connector receiver modules in media playback devices for passenger seats within an aircraft, where each connector receiver module is configured to electrically connect to a connector of a media output device such as a headset.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Aircrafts today have individualized functional equipment dedicated to a passenger seat, which can be utilized by a passenger, such as adjustable seats, adjustable environmental controls, adjustable lighting, telephony systems, media playback devices such as video and/or audio entertainment systems, crew communication systems, and the like. For example, many commercial airplanes have individualized video and audio entertainment systems, often referred to as "in-flight entertainment" or "IFE" systems.

Travelers are generally encouraged to use media output devices such as headsets with the IFE systems to listen to the audio from the IFE systems. For example, a traveler may insert a connector of a headset into a plug for a respective IFE system, to electrically connect to the respective IFE system and to play audio on the headset.

After use by a passenger, it is quite common for a connecting pin of a headset to be stuck inside of a plug of an IFE system, often causing damage to the plug. A passenger may mishandle the connecting pin of the headset or apply force on the connecting pin while the connecting pin is plugged into the plug, which may damage the plug and/or cause the connecting pin to break off and to be stuck inside the plug. It may be a difficult task to manually check every plug for any failures. Continuous efforts are being made to develop technologies that can monitor for plug failures in IFE systems.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures:

FIG. 3C is an example diagram illustrating maintenance indicators for multiple seat devices, according to one aspect of the present disclosure;

DETAILED DESCRIPTION

In one aspect, innovative technology is disclosed for detecting and indicating faulty plugs for headsets in media playback devices for passenger seats within a transportation vehicle, e.g., an aircraft. As described below in detail, the innovative technology automatically determines whether a connector receiver module is electrically connected to a connector of a media output device (e.g., a seat device) during maintenance mode. A load parameter is measured at the connector receiver module in response to determining that the connector receiver module is electrically connected to the connector. The load parameter is associated with an electrical load at the connector receiver module. When the load parameter is below a load threshold, a maintenance indicator indicates the location of the media playback device. The maintenance indicator is based on at least determining whether the connector receiver module is electrically connected to the connector or that the load parameter is below the load threshold. Details regarding the innovative techniques are provided below.

As a preliminary note, the terms "component", "module", "system", and the like as used herein are intended to refer to a computer-related entity, either software-executing general-purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

Figure 1A:
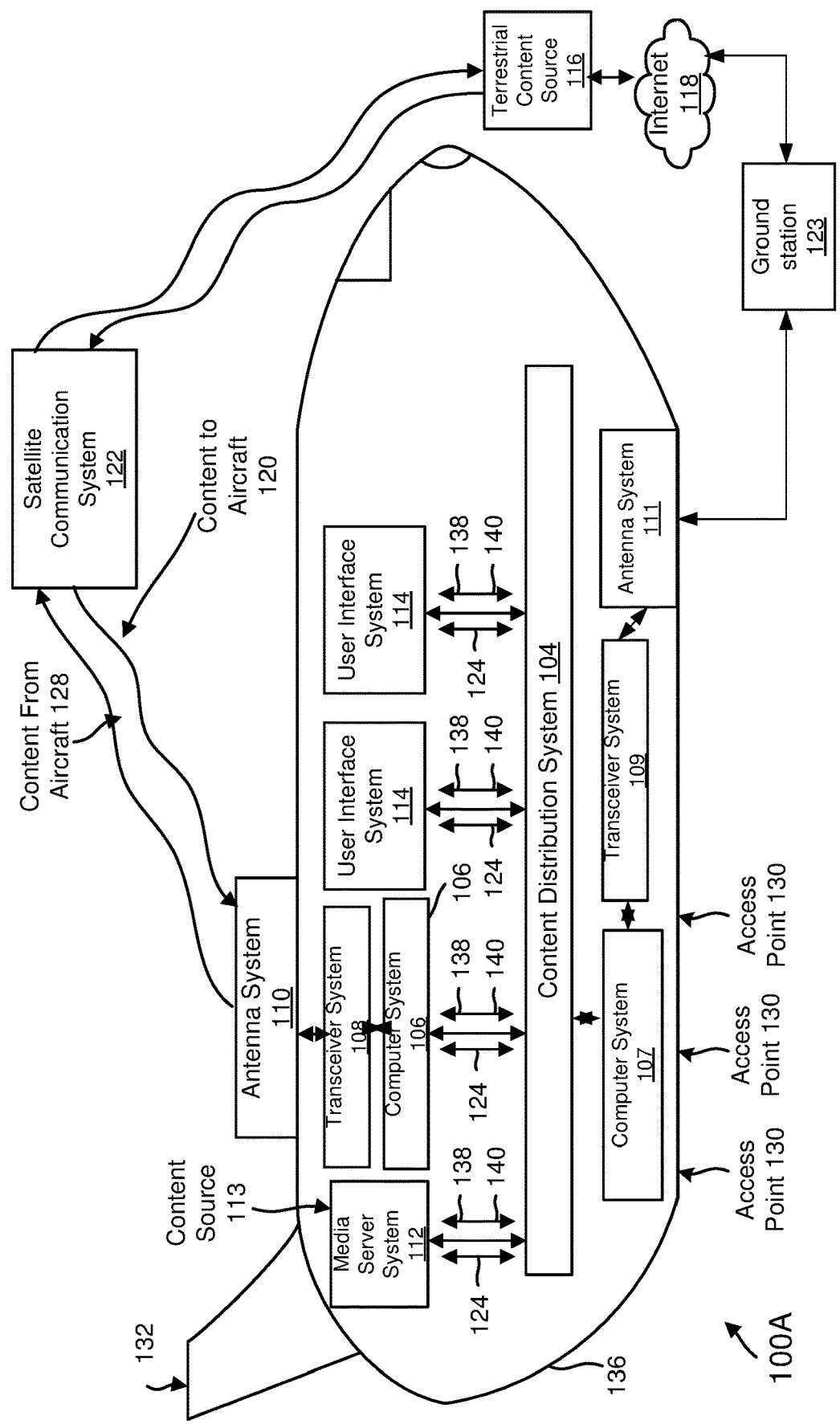
FIG. 1A shows an example of an operating environment for implementing the various aspects of the present disclosure on an aircraft.

Vehicle Information System: FIG. 1A shows an example of a generic vehicle information system 100A (also referred to as system 100A) that can be configured for installation aboard an aircraft 132, according to one aspect of the present disclosure. When installed on an aircraft, system 100A can comprise an aircraft passenger IFE system, such as the Series 2000, 3000, eFX, eX2, eXW, eX3, NEXT, and/or any other in-flight entertainment system developed and provided by Panasonic Avionics Corporation (without derogation of any trademark rights of Panasonic Avionics Corporation) of Lake Forest, California, the assignee of this application.

Figure 3A:
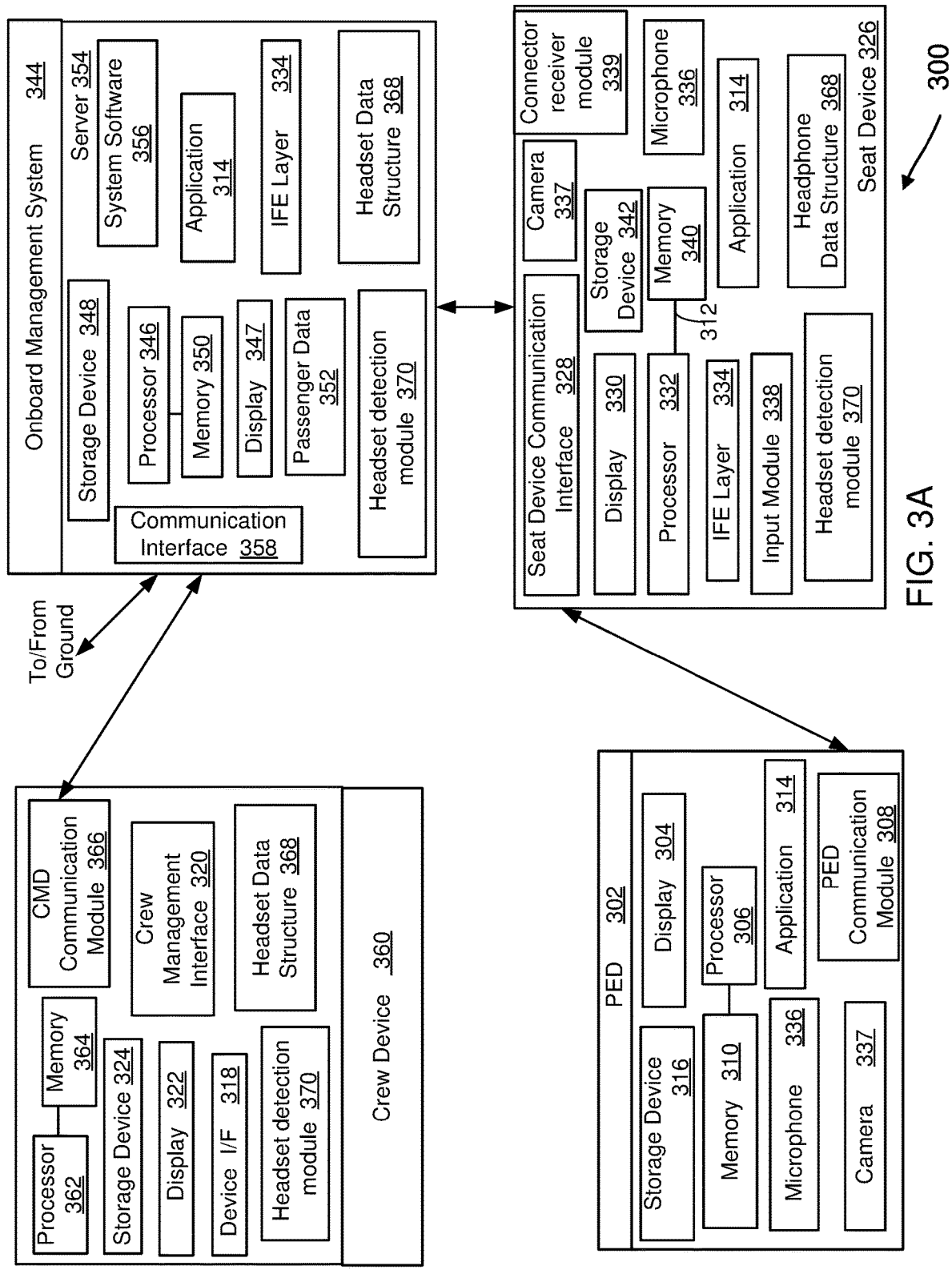
FIG. 3A shows an example of a system configured to operate within an aircraft system, according to one aspect of the present disclosure.

System 100A may include one or more content source 113 and one or more user (or passenger) interface systems (may also be referred to as a seat device/seatback device/IFE device 326 described below with respect to FIG. 3A) 114 that communicate with a real-time content distribution system 104.

As an example, the content sources 113 may include one or more internal content sources, such as a media server system 112, that are installed aboard the aircraft 132, one or more remote (or terrestrial) content sources 116 that can be external from the aircraft 132, or a distributed content system. The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photograph album content, audiobook content, and/or movie content without limitation. The viewing content as shown and described herein is not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a solid state drive (SSD) system, or a hard disk drive (HDD) system, of any suitable kind, for storing preprogrammed content and/or downloaded content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming and/or live wireless video/audio streaming, the viewing content likewise can include two-way communications, such as real-time access to the Internet 118 and/or telecommunications and/or a ground station 123 that communicates through an antenna 111 to a transceiver system 109, and a computer system 107 (similar to computer system 106). The functionality of computer system 107 is like computing system 106 for distributing content using the content distribution system 104 described herein. It is noteworthy that although two antenna systems 110/111 have been shown in FIG. 1A, the adaptive aspects disclosed herein may be implemented by fewer or more antenna systems.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122 or the ground station 123.

System 100A can receive content 120 from a selected terrestrial content source 116 and/or transmit (upload) content 128, including navigation and other control instructions, to the terrestrial content source 116. In one aspect, content 120 includes media content that is stored persistently on the aircraft for passenger consumption. The media content for persistence storage is handled differently than live television content, as described below. As desired, terrestrial content source 116 can be configured to communicate with other terrestrial content sources (not shown). Terrestrial content source 116 is shown as providing access to the Internet 118. Although shown and described as comprising the satellite communication system 122 and the cellular base station 123 for purposes of illustration, the communication system can comprise any conventional type of wireless communication system, such as any wireless communication system and/or an Aircraft Ground Information System (AGIS) communication system.

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system (may also referred to as broadband controller) 108, to a computer system 106 of system 100A. The computer system 106 can provide the received viewing content 124 to the media (or content) server system 112 and/or directly to one or more of the user interfaces 114 including a PED, as desired. Although shown and described as being separate systems for purposes of illustration, the computer system 106 and the media server system 112 can be at least partially integrated.

The user interface system 114 may be computing terminals in communication with an access point 130. The user interface system 114 provides a display device to view content.

The user interface system 114 includes a hardware interface to connect to an access point 130 that provides a wired and/or a wireless connection for the user interface system. In at least one embodiment, the user interface system 114 comprises a software application that a user downloads and installs on a PED to receive and view content via a wireless access point 130. While bandwidth limitation issues may occur in a wired system on a vehicle, such as an aircraft 132, in general the wired portion of the vehicle information 100A system is designed with enough bandwidth to support all users aboard the vehicle, i.e., passengers.

The user interface system 114 can include an input system (not shown) for permitting the user (or passenger) to communicate with system 100A, such as via an exchange of control signals 138. For example, the input system can permit the user to input one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124 or for any other reason, payment information likewise can be entered via the input system. The input system can be provided in any conventional manner and typically includes a touch screen, application programming interface (API), one or more switches (or pushbuttons), such as a keyboard or a keypad, and/or a pointing device, such as a mouse, trackball, or stylus.

In one aspect, the user interface system 114 is provided on individual passenger seats of aircraft 132. The user interface system 114 can be adapted to different aircraft and seating arrangements and the adaptive aspects described herein are not limited to any specific seat arrangements or user interface types.

Figure 1B:
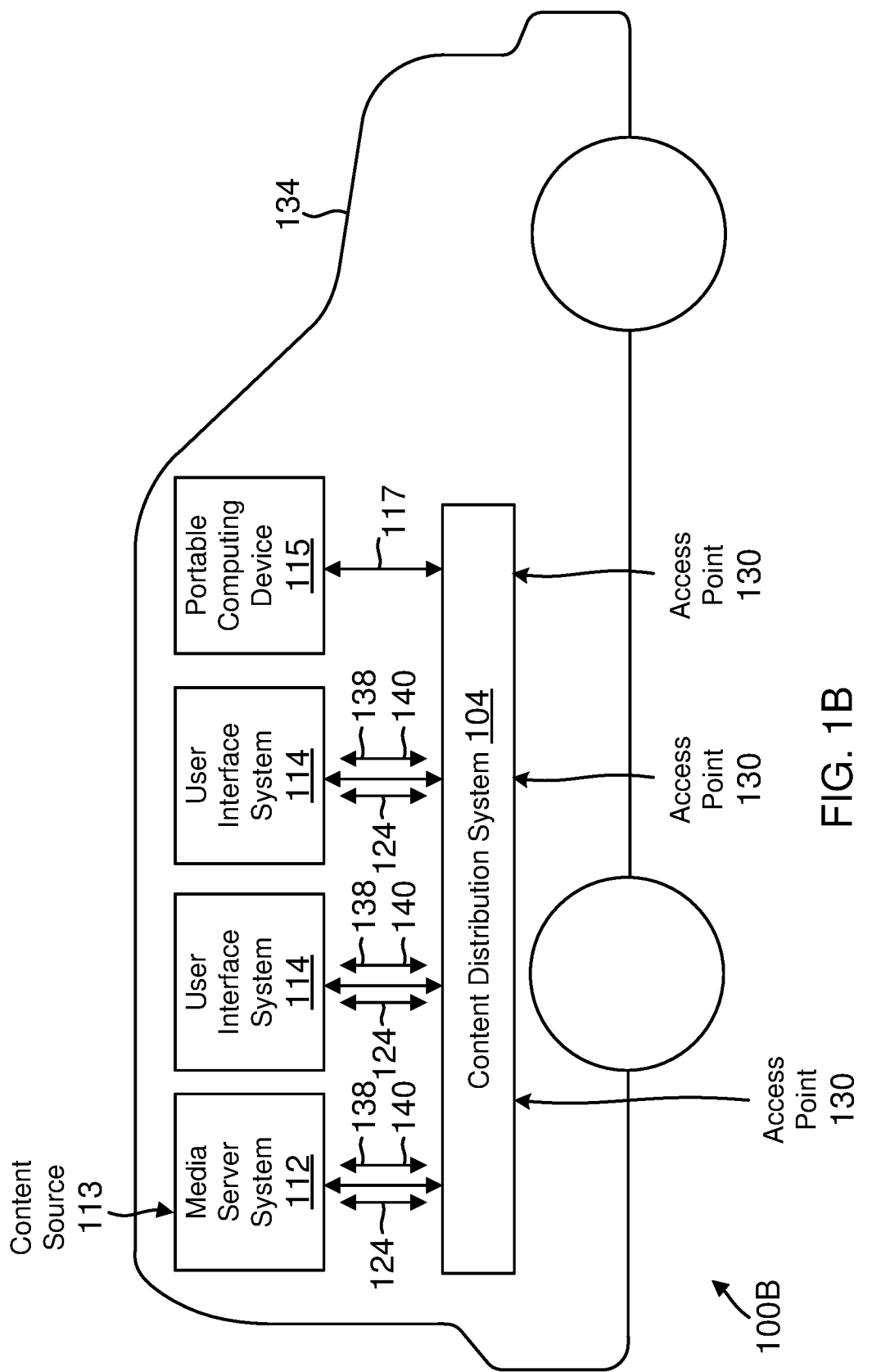
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be like the components of system 100A described above with respect to FIG. 1A and for brevity are not described again.

Figure 2:
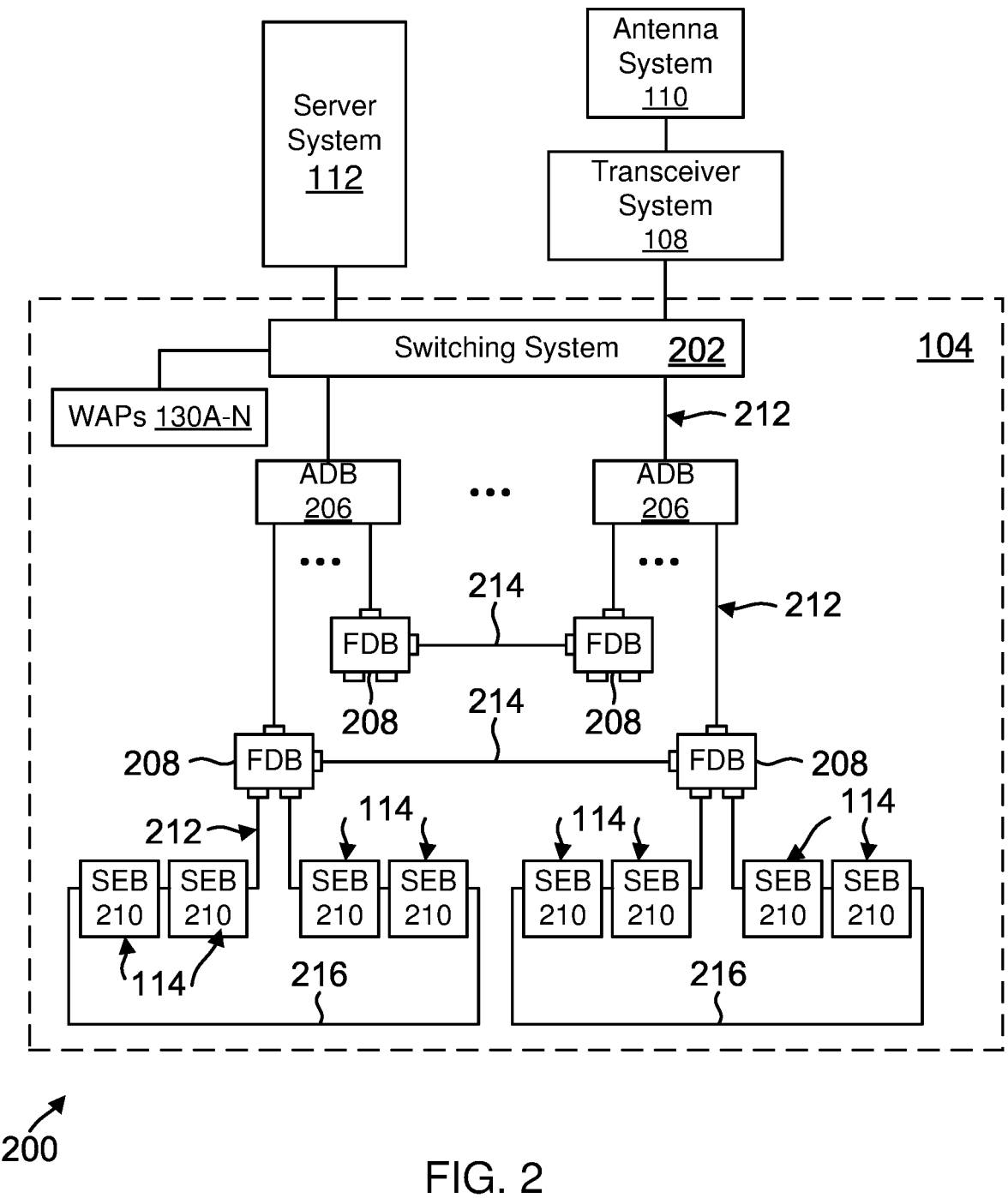
FIG. 2 shows an example of a content distribution system, used according to one aspect of the present disclosure.

Content Distribution System: FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114. The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16.

Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212.

The distribution system 104 likewise can include a switching system 202 for providing an interface between the distribution system 104 and the server system 112. The switching system 202 can comprise a conventional switching system, such as an Ethernet switching system, and is configured to couple the server system 112 with the ADBs 206. Each of the ADBs 206 is coupled with, and communicates with, the switching system 202. In addition, the distribution system 104 includes one or more wireless access points (WAPs) (130A to 130N) connected in communication with the switch system 202 for wireless distribution of content to user interface systems 114 including PEDs.

Each of the ADBs 202, in turn, is coupled with, and communicates with, at least one FDB 208. Although the ADBs 206 and the associated FDBs 208 can be coupled in any conventional configuration, the associated FDBs 208 preferably are disposed in a star network topology about a central ADB 206 as illustrated in FIG. 2. Each FDB 208 is coupled with, and services, a plurality of daisy-chains of SEBs 210. The SEBs 210, in turn, are configured to communicate with the user interface systems 114. Each SEB 210 can support one or more of the user interface systems 114.

The switching systems 202, the ADBs 206, the FDBs 208, the SEBs (and/or VSEBs), and/or PSEBs) 210, the antenna system 110 (or 111), the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

Distribution system 104 can include at least one FDB internal port bypass connection 214 and/or at least one SEB loopback connection 216. Each FDB internal port bypass connection 214 is a communication connection 212 that permits FDBs 208 associated with different ADBs 206 to directly communicate. Each SEB loopback connection 216 is a communication connection 212 that directly couples the last SEB 210 in each daisy-chain of seat electronics boxes 210 for a selected FDB 208 as shown in FIG. 2. Each SEB loopback connection 216 therefore forms a loopback path among the daisy-chained seat electronics boxes 210 coupled with the relevant FDB 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

System 300: FIG. 3A shows an example of a system 300 configured to operate within an aircraft system including an onboard management system 344 executing an IFE layer, according to one aspect of the present disclosure. In one aspect, system 300 includes the onboard management system 344 with a server 354, a seat device 326 (also referred to as media playback device), a PED 302, when authorized, and a crew device (may be referred to as "CMD") 360, when authorized. In yet another aspect, system 300 includes the CMD 360 and the seat device 326, respectively.

In one aspect, the onboard management system 344 includes server 354 (similar to the media server 112 and/or computer system 106/107 described above with respect to FIGS. 1A/1B). The server 354 includes a processor 346 that has access to a memory 350 via a bus system/interconnect (similar to 312 on seat device 326). The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 346 may be, or may include, one or more programmable, hardware-based, general-purpose or special-purpose microprocessors, digital signal processors (DSPs), programmable controllers, application specific integrated circuits (ASICs), programmable logic devices (PLDs), or the like, or a combination of such devices.

Processor 346 has access to a storage device 348 that may be used to store data (for example, passenger data 352, a headset data structure 368 (may also be referred to as data structure 368) and a headset detection module 370 (may be referred to as module 370) for detecting a media output device such as a headset connected to the seat device 326, as described below in detail, applications and program files, including system software 356, application 314, and others. As described below in detail, media output device such as a headset may be connected to the seat device 326 via a connector receiver module 339 of the seat device 326. For example, a male pin connector of a headset may be plugged into the connector receiver module 339 that is in a form of a plug configured to receive the male pin connector. It is noteworthy that module 370 may also be executed at the seat device 326, or any other computing device including CMD 360.

In one aspect, system software 356 is executed by processor 346 to control the overall operation of the server 354. Application 314 may be downloaded from server 354 by passengers using an authorized PED 302 paired with the seat device 326 and/or server 354 for accessing digital content.

In one aspect, the onboard management system 344 includes a display 347 to display information. The display 347 may also include a touch screen for receiving input commands. For example, the display 347 may be used to display maintenance information, such as maintenance indicators associated with seat devices, as described below. For example, a maintenance crew may be able to view the maintenance information on display 347 and perform any necessary tasks based on the maintenance information.

In one aspect, the onboard management system 344 maintains flight and passenger data 352 (may also be referred to as data 352), for example, flight itinerary including origin location, layover locations, destination location, arrival time and other information. Data 352 may also include passenger data that identifies each passenger for a flight, a seat assigned to a passenger, a language preference for the passenger, and any other information that can uniquely identify the passengers. Data 352 may be retrieved from a ground system before flight departure.

In one aspect, server 354 communicates with CMD 360, PED 302 and/or seat device 326 via the communication interface 358. The communication interface 358 may also be used to receive information from the ground, for example, data 352 and other information. The communication interface 358 includes one or more interfaces for a wired and/or wireless connection, as described above with respect to FIGS. 1A/1B and 2.

In one aspect seat device 326 includes a display device 330, a processor 332, a memory 340, a seat device communication interface (also referred to as communication interface) 328 and a local storage device 342 for storing content. The seat device may optionally include a camera 337 and a microphone 336. The camera may be used to take pictures and videos and the microphone may be used for receiving voice input.

In one aspect, the seat device 326 receives user input/requests via an input module 338. The input module 338 may be configured to use a local touch screen included with display 330, a local virtual keyboard, an external mouse, external keyboard or any other input device.

In one aspect, processor 332 has access to memory 340 via an interconnect 312. Processor 332 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The bus system 312 is an abstraction that represents any one or more separate physical buses and/or point-to-point connections, connected by appropriate bridges, adapters and/or controllers. The bus system 312, therefore, may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

In one aspect, processor 332 executes an IFE layer 334 out of memory 340. The IFE layer 334 provides in-flight entertainment and other options for users. The IFE layer 334 provides audio/video content as well as controls for accessing the content.

In one aspect, the IFE layer 334 uses the seat device communication interface 328 to interface with the PED 302 and/or onboard management system 344. The communication interface 328 includes logic and circuitry for interfacing with the onboard management system 344 and/or PED 302. In one aspect, the communication interface 328 may use a wireless and/or wired connection for such communication.

In one aspect, processor 332 executes module 370 and maintains headset data structure 368 that can be used for detecting a media output device such as a headset, as described below in detail. In one aspect, the seat device 326 includes or interfaces with the connector receive module 339 that receives a headset plug. Details regarding the connector receive module 339 are provided below.

In another aspect, the seat device 326 may also execute the application 314 that may be used by the passenger to view media content or various computing functions that are enabled by the seat device 326. Application 314 when executed by the seat device 326 may have different functionality compared to when application 314 is executed by the PED 302.

The seat device 326 on the aircraft may be part of the user interface system 114 or interfaces with the user interface system 114 also described above with respect to FIGS. 1A/1B. It is noteworthy that seat device 326 need not be mounted on the back of a seat and may be supported from other structures, such as a bulkhead, wall, arm of a seat, etc. The adaptive aspects of the present disclosure are not limited to any specific location or orientation of the seat device 326.

In one aspect, CMD 360 that may be a mobile phone, a notebook, a tablet, a laptop or any other similar device. CMD 360 may include a processor 362 that has access to a memory 364 via a bus system/interconnect (similar to 312) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 362 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

In one aspect, CMD 360 includes a display 322 to display information. Display 322 may also include a touch screen for receiving input commands. CMD 360 typically includes a microphone (not shown) for receiving voice input. CMD 360 may also include a camera (not shown) for taking pictures or making a video. The CMD 360 may also include a storage device 324 that may include any storage medium for storing data in a non-volatile manner, such as one or more magnetic or optical based disks, flash memory, or solid-state drive. The storage device 316 may be used to store a device interface 318, may also be referred to as a "crew management interface (CMI)" 318 that may be executed out of memory 364.

The CMI 318 enables the CMD 360 to interface with the onboard management system 344 via a CMD communication module 366. The CMD 360 may present one or more APIs to the onboard management system 344 to retrieve passenger/flight data and update headset detection structure 368. The non-limiting API format and syntax will depend on the protocols used by the CMD 360 and the onboard management system 344.

In one aspect, the CMD communication module 366 is also used to communicate with the seat device 326, when installed, and one or more PEDs 302. CMI 320 receives information regarding one or more seat attributes that do not meet take-off and/or landing conditions. CMI 320 notifies the seat device and/or paired PED 302 if a passenger needs to take action (e.g., move the passenger seat, tray table, window or any other action.

In one aspect, the CMD communication module 366 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the CMD communication module 366 for convenience, the communication module may have different interface, cards, logic and circuitry to comply with the different communication protocols/standards.

In one aspect, the PED 302 is securely paired with the seat device 326. The term "pair" means that PED 302 is associated and authenticated by the seat device 326 and/or server 354 to send and receive information.

As an example, the PED 302 may be a mobile phone, a notebook, a tablet, a laptop or any other computing device. PED 302 may include a processor 306 that has access to a memory 310 via a bus system/interconnect (similar to 312 on the seat device 326) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 306 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

PEDs 302 may also include a microphone 336 for receiving voice input from a passenger. The voice input can be converted into text by application 314 for processing. In another aspect, PED 302 also includes a camera 337 that may be used by a passenger to upload a video.

PED 302 includes a storage device 316 that may be or may include any storage medium for storing data in a non-volatile manner, such as one or more magnetic or optical based disks, flash memory, or solid-state drive. The storage device 316 may be used to store content displayed on display 304 of PED 302 when used by a passenger. In one aspect, display 304 may include a touch screen for receiving input commands.

The storage device 316 may also store the application 314 that is executed out of memory 310. Application 314 may be used to pair the PED 302 with the aircraft systems to receive content from device 115, as well as to communicate with CMD 360.

As an example, application 314 may be made available for download and installation via a public repository such as that maintained respectively under the trademark GOOGLE PLAY by Google, Inc. and/or the APP STORE maintained by Apple Inc. (without derogation to any third party trademark rights). In addition, application 314 may be provided for download by an airline carrier on a website or from the onboard management system 344.

In one aspect, PED 302 uses a PED communication module 308 to communicate with the seat device 326 and/or CMD 360, when installed. In one aspect, PED communication module 308 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the PED communication module 308 for convenience, the communication module may have different interface, cards, logic and circuitry to comply with the different communication protocols/standards.

Figure 3B:
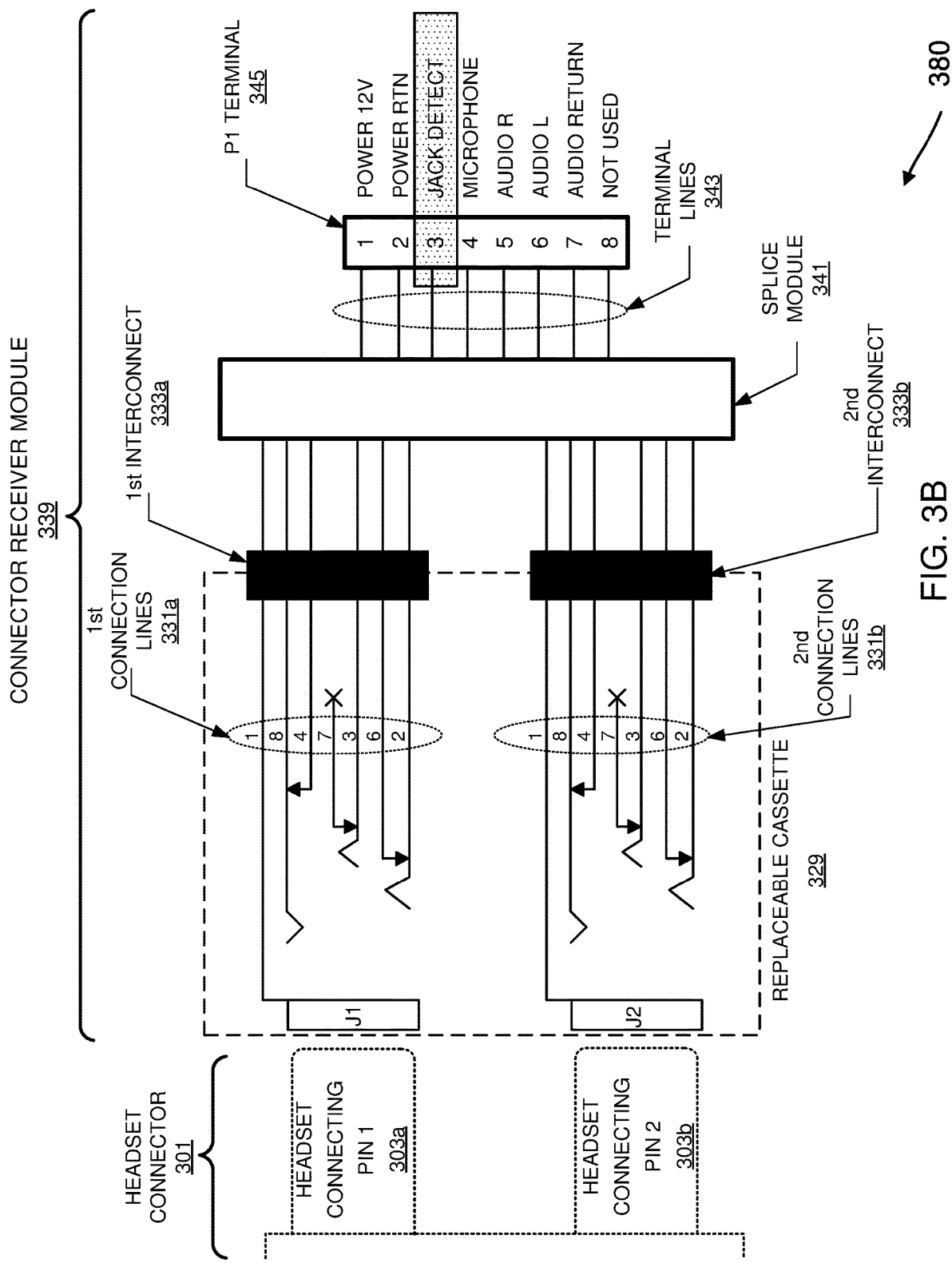
FIG. 3B shows an example of a connector receiver module of a seat device of FIG. 3A, according to one aspect of the present disclosure.

Connector receiver module 339: FIG. 3B shows an example diagram 380 of the connector receiver module 339 of the seat device 326 of FIG. 3A, according to one aspect of the present disclosure. In the example of FIG. 3B, the connector receiver module 339 includes a first plug J1 and a second plug J2 configured to receive two headset connecting pins of a headset connector for a headset, such as a first connecting pin 303a and a second connecting pin 303b of a headset connector 301 for a headset (not shown). However, the number of the plugs at the connector receiver module 339 or the number of the headset connecting pins is not limited to two, and may be less than or greater than two. In another example not shown in FIG. 3B, the connector receiver module 339 may include only a single plug for a headset with a connector configured with a single headset connecting pin.

As shown in FIG. 3B, the first plug J1 leads a corresponding connecting pin (e.g., first connecting pin 303a) to a plurality of lines, labelled 1-8 of first connection lines 331a and the second plug J2 leads a corresponding connecting pin (e.g., second connecting pin 303b) to a plurality of lines, labelled 1-8 of second connection lines 331b. Lines 1-8 of the first connection lines 331a and the lines 1-8 of the second connection lines 331b are spliced by a splice module 341 that is connected to a P1 terminal 345 via lines 1-8 of terminal lines 343. In an aspect, the lines 1-8 of the first connection lines 331a are respectively connected to the lines 1-8 of terminal lines 343 via the splice module 341 and the lines 1-8 of second connection lines 331b are also respectively connected to the lines 1-8 of terminal lines 343 via the splice module 341. The P1 terminal 345 includes pins 1-8 (or any number of pins) respectively corresponding to connections to POWER 12V, POWER RTN. JACK DETECT discrete, MICROPHONE, AUDIO R, AUDIO L, AUDIO RETURN, and NOT USED. For terminal lines 343, line 1 is connected to a power supply (POWER 12V) and line 2 is connected to a POWER RTN (return), while line 3 is connected to a JACK DETECT discrete that detects an inserted headset plug. Further, for terminal lines 343, line 4 is connected to a MICROPHONE, line 5 is connected to right AUDIO, line 6 is connected to left AUDIO, and line 7 is connected to AUDIO RETURN. Line 8 of terminal line 343 is not used.

When the headset connecting pins of a headset connector (also referred to as headset jack) are inserted into the first and second plugs J1 and J2, the Jack Detect discrete indicates that the headset jack is detected. For example, when the headset connecting pins are inserted into the first and second plugs J1 and J2, the Jack Detect discrete is set to ground or active low, which may trigger a particular action. For example, when the Jack Detect discrete is set to ground or active low, the display 330 of the seat device 326 may display an indication that a headset is connected. If the headset connecting pins are not inserted into the first and second plugs J1 and J2, the Jack Detect discrete is set to open. In one aspect, if the headset connecting pins inserted in the first and second plugs J1 and J2 are removed, the Jack Detect discrete changes from ground or active low to open. This change may trigger a certain action. For example, when the headset connecting pins are removed, the change at the Jack Detect discrete may pause reproduction of a media content at the seat device 326.

In one aspect, the first plug J1, the second plug J2, the first connection lines 331a, and the second connection lines 331b may be a part of a replaceable cassette 329 that can be replaced with another replaceable cassette as LRU. For example, if one or more of the first plug J1, the second plug J2, the first connection lines 331a, and the second connection lines 331b are damaged, the replaceable cassette 329 may be replaced with another equivalent replaceable cassette having undamaged plugs and connection lines. Hence, if there is an indication that the connector receiver module 339 is faulty, as described below, then the replaceable cassette 329 may be replaced with another equivalent replaceable cassette.

In this aspect, the replaceable cassette 329 may be connected to the rest of the connector receiver module 339 via interconnections, such as a first interconnect 333a and a second interconnect 333b as shown in FIG. 3B. In one aspect, the first connection lines 331a are connected to the first interconnect 333a and the second connection lines 331b are connected to the second interconnect 333b. Each of the first interconnect 333a and the second interconnect 333b may include cable connectors so that the replaceable cassette 329 may be removed conveniently by disconnecting the first interconnect 333a and the second interconnect 333b from the rest of the connector receiver module 339. For example, the first interconnect 333a and the second interconnect 333b may be Molex connectors.

A common maintenance task on the seat device 326 is to check if the connector receiver module 339 is working properly. The plugs of the connector receiver module 339 such as the first and second plugs J1 and J2 can often cause issues to be resolved by maintenance work. For example, while navigating through seats or moving around, a passenger may lean against the connecting pin(s) of a headset that are plugged into the plug(s), causing damage to the connecting pin(s) and/or the plug(s). Further, the connecting pin(s) may easily break off with some force and may remain inserted in the plug(s). One way to check if the connector receiver module 339 is working properly is by manually checking the connector receiver module 339, e.g., by checking to see if the plug(s) of the connector receiver module 339 have no issues. However, such manual checking of the connector receiver module 339 may be time consuming and cumbersome, especially when there are many seats and thus many seat devices to check. Further, there may be situations where only a short time is available for checking if the connector receiver module 339 is working properly. For example, for a quick turn-around flight that has only a short time for maintenance between landing and take-off, the maintenance task of the seat devices needs to be performed quickly. Therefore, an efficient approach to monitor for faulty connector receiver modules for seat devices is desired and provided by the innovative technology disclosed herein.

According to some aspects of the disclosure, one or more indicators related to maintenance of seat devices may be provided based on monitoring of electrical conditions at connector receiver modules (e.g., connector receiver module 339) of seat devices (e.g., seat device 326), as the electrical conditions at the connector receiver modules may indicate whether the connector receiver modules are operating properly. Such indicators may be provided during maintenance mode when passengers are not on board and thus not utilizing the seat devices. For example, if connector pin(s) of a headset are left inserted in the plug(s) of the seat device, the load condition at the connector receiver may be checked, based on which the indicators related to maintenance are provided.

There may be different examples providing different electrical conditions at a connector receiver module. In one example, one electrical condition may result from headset connector pin(s) being broken off and left inserted in plug(s) of a seat device. In another example, a different electrical condition may result from headset connector pin(s) being left inserted in the plug(s) of the seat device, without the headset connector pin(s) being broken off.

In one aspect of the disclosure, during a maintenance mode, module 370 of the seat device 326 first determines whether the connector receiver module 339 is electrically connected to a connector of a media output device (e.g., headset). For example, module 370 may determine whether the connector receiver module 339 is electrically connected to the connector by determining whether a jack detection pin (e.g., jack detection discrete) at the seat device 326 is set to the ground. The connector receiver module 339 is configured to set the jack detection pin to the ground when module 370 determines that the connector receiver module 339 is electrically coupled to connecting pin(s) of the connector. Hence, for example, if the connector pin(s) of the media output device are inserted in the plug(s) of the connector receiver module 339, this will cause the jack detection pin to be set to ground or active low and thus module 370 of the seat device 326 will determine that the connector receiver module 339 is electrically connected to the connector of the media output device. On the other hand, if the connector pin(s) of the media output device are not inserted in the plug(s) of the connector receiver module 339, the jack detection pin will not be set to ground or active low and thus module 370 of the seat device 326 will determine that the connector receiver module 339 is not electrically connected to the connector. In an aspect, if the connector receiver module 339 is not electrically connected to the connector, no maintenance indicator may be provided because this can be interpreted as pins of the connector of the media output device not being left inserted in the plug(s) of the connector receiver module 339.

If module 370 of seat device 326 determines that the connector receiver module 339 is electrically connected to the connector of the media output device, then the seat device 326 measures a load parameter at the connector receiver module 339. The load parameter is associated with an electrical load at the connector receiver module 339. In an aspect, the load parameter is based on a current through the seat device 326 and/or a power across the seat device 326. By measuring the load parameter, seat device 326 may be able to obtain additional information about the status of the connector receiver module 339. In an example, if the media output device is properly plugged in the connector receiver module 339, then the power should be measured around 20 milliwatts and the current should be measured around 1.8 milliamps. On the other hand, in this example, if the medial output device is not plugged in the connector receiver module 339, then the power should be measured around 10 milliwatts and the current should be measured around 0.9 milliamps. In this example, when module 370 of the seat device 326 determines that the connector receiver module 339 is electrically connected to the connector of the media output device, the power being below 10 milliwatts and/or the current being below 0.9 milliamps may indicate that the connector receiver module 339 may be faulty. As such, measuring the load parameter may help determine whether the connector receiver module 339 is properly working.

After measuring the load parameter, module 370 of the seat device 326 determines whether the load parameter is below a load threshold, and then reports a maintenance indicator indicating a location of the seat device 326. The maintenance indicator is based on determining whether the connector receiver module 339 is electrically connected to the connector and/or determining whether the load parameter is below the load threshold. For example, one type of maintenance indicator may be provided if the connector receiver module 339 is electrically connected to the connector and the load parameter is below the load threshold, and a different type of maintenance indicator may be provided if the connector receiver module 339 is electrically connected to the connector and the load parameter is not below the load threshold.

In an aspect, the maintenance indicator may include either a failure indicator indicating that the connector receiver module 339 is faulty or a warning indicator indicating presence of a potential issue with the connector receiver module 339. In this aspect, the seat device 326 may report the failure indicator when the connector receiver module 339 is electrically connected to the connector and the load parameter is below the load threshold. In this aspect, on the other hand, the seat device 326 may report the warning indicator when the connector receiver module 339 is electrically connected to the connector but the load parameter is not below the load threshold. In an example, if the connector receiver module 339 is electrically connected to the connector but the load parameter is not below the load threshold, then this may mean that the connector receiver module 339 may be functioning properly but the connector of the media output device may be left inserted in the connector receiver module 339. In an example, if the connector receiver module 339 is electrically connected to the connector and the load parameter is below the load threshold, then this may mean that the connector receiver module 339 may not be functioning properly and it is possible that pin(s) of the connector of the media output device may be broken off and left inserted in the connector receiver module 339.

In an aspect, the load threshold may include a current threshold such as 0.9 milliamps if the load parameter is based on the current, and/or may include a voltage threshold such as 10 milliwatts if the load parameter is based on the power. Therefore, for example, if the load threshold includes only the current threshold, then the load threshold is below the load threshold if the current through the seat device 326 is below the current threshold. On the other hand, if the load threshold includes only the power threshold, then the load threshold is below the load threshold if the power across the seat device 326 is below the power threshold. In an example, if the load threshold includes both the current value and the voltage value, the seat device 326 may determine that the load parameter is below the load threshold if either the current through the seat device 326 is below the current threshold or the power across the seat device 326 is below the power threshold.

As an example, the threshold values are stored in data structure 368. The threshold values are used by module 370 to provide a maintenance indicator. The data structure 368 also stores the measured load parameters and the state of the connector receive module 339.

An aircraft generally includes multiple seat devices, and thus there may be situations where one or more of the multiple seat devices report one or more maintenance indicators to the onboard management system 344. When module 370 executed by the onboard management system 344 receives one or more maintenance indicators respectively associated with one or more seat devices of the multiple seat devices, the onboard management system displays these one or more maintenance indicators with their own seat device locations.

In an aspect, the seat device 326 may report the load parameter, e.g., to the onboard management system 344. In this aspect, module 370 executed by the onboard management system 344 may compare the load parameter with other load parameters reported respectively from other media playback devices, to determine whether to generate maintenance indicators.

In one approach, module 370 of the onboard management system 344 receives a load parameter from each of multiple seat devices and thus may provide additional warning indicators based on analysis of load parameters from the multiple seat devices. For example, especially when there are many seats and thus many seat devices, a seat device with a load parameter that is far off from an average load parameter of the load parameters of all seat devices may be flagged as an outlier and thus need attention from a maintenance crew. In an aspect, each of multiple seat devices report their respective load parameter, and thus the module 370 of onboard management system 344 receives the load parameters respectively from the multiple media playback devices.

Module 370 of the onboard management system 344 then determines a relative load range based on the load parameters from the multiple seat devices. In an aspect, module 370 og the onboard management system 344 may determine the relative load range based on an average value of the load parameters. For example, the relative load range may be a certain range near the average value of the load parameters. In one example, the relative load range may be from a lower bound defined as the average value minus N % of the average value to an upper bound defined as the average value plus N % of the average value. For example, if N is 10 and the average value is M, then the relative load range is from (M−10%×M) to (M+10%×M).

Subsequently, the onboard management system 344 identifies seat device(s), out of the multiple seat devices, that are respectively associated with their load parameter(s) outside the relative load range. Then, the onboard management system 344 displays additional warning indicator(s) indicating location(s) of these seat device(s).

FIG. 3C is an example diagram illustrating maintenance indicators for multiple seat devices, according to one aspect of the present disclosure. In an example, a maintenance indicator table 390 that may be part of data structure 368 shows seat locations of seat devices associated with the maintenance indicators, and shows two types of maintenance indicators, a warning indicator, and a failure indicator. In the example shown in FIG. 3C, the failure indicator indicates that a connector receiver module of a particular seat device has failed and thus the replaceable cassette including the audio plug(s) of the connector receiver module needs to be replaced. For example, as discussed above, the failure indicator for a particular seat device may be reported if a jack detection pin at the seat device 326 is set to a ground or active low but the load detected is low (e.g., the load parameter being below the load threshold).

Furthermore, in the example shown in FIG. 3C, the warning indicator indicates that a connector receiver module of a particular seat device needs to be checked to determine if a headset connector remains in the connector receiver module (e.g., in the plug(s)). For example, as discussed above, the warning indicator for a particular seat device may be reported if a jack detection pin at the seat device 326 is set to a ground or active low but the load detected is not low (e.g. the load parameter not being below the load threshold). In an aspect, for example, as discussed above, the warning indicator may also be displayed if the onboard management system 344 determines that a load parameter for a particular seat device is outside of the relative load range.

In FIG. 3C, seat devices at seat locations 1F, 11D, and 20D are indicated with the warning indicator, and seat devices at seat locations 6B, 16A, 16F, and 18C are indicated with the failure indicator. FIG. 3C provides an example graphical display 394 of aircraft seats with the maintenance indicators. The graphical display 394 corresponds to the maintenance indicator table 390, and thus shows that the warning indicator at the seat locations 1F, 11D, and 20D and the failure indicator at the seat locations 6B, 16A, 16F, and 18C.

Figure 4A:
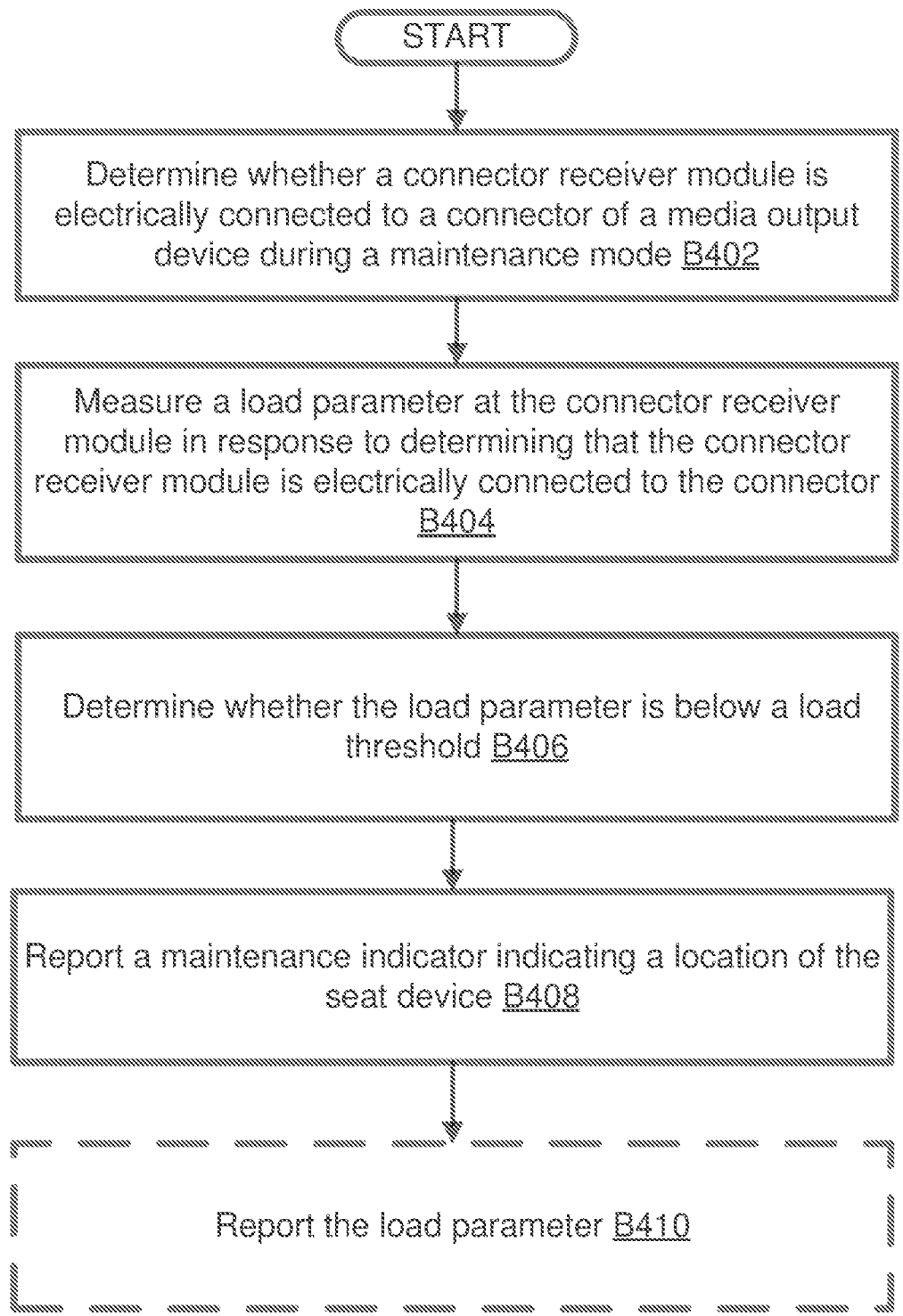
FIG. 4A shows a process flow diagram for detecting a failure in a connector receiver module of a seat device of a transportation vehicle, according to one aspect of the present disclosure.

Process Flow: FIG. 4A shows a process 400 for detecting a failure in a connector receiver module in a seat device of a transportation vehicle (e.g., an aircraft), according to one aspect of the present disclosure. The seat device may be seat device 326 of FIGS. 3A and 3B and may also be referred to as a media playback device. Process 400 is executed by the headset detection module 370 configured to utilize headset data structure 368. As mentioned above, the headset detection module 370 may be executed in the server 354 and/or the seat device 326. As a preferred aspect, process 400 may be executed by the headset detection module 370 of the seat device 326.

Process 400 begins in block B402, the seat device 326 determines whether a connector receiver module 339 is electrically connected to a connector of a media output device during a maintenance mode. In an aspect, this determination in block B402 may be based on determining whether a jack detection pin at the seat device 326 is set to a ground, where the connector receiver module 339 is configured to set the jack detection pin to the ground in response to the connector receiver module 339 being electrically coupled to a connecting pin of the connector. As shown in FIG. 3B, the connector receiver module 339 may be electrically connected to the connector 301 of a headset if the first headset connecting pin 303a and the second headset connecting pin 303b are properly inserted into the first and second plugs J1 and J2 of the connector receiver module 339, thereby setting the JACK DETECTION discrete to ground or active low. Hence, the JACK DETECTION discrete conventionally used to detect whether a headset is inserted is repurposed to be used to monitor for failure of the connector receiver module 339.

In block B404, the seat device 326 measures a load parameter at the connector receiver module 339 in response to determining that the connector receiver module 339 is electrically connected to the connector. Here, the load parameter is associated with an electrical load at the connector receiver module 339.

In block B406, the seat device 326 determines whether the load parameter is below a load threshold. In an aspect, the load parameter is based on at least one of a current through the seat device 326 or a power across the seat device 326. In this aspect, the load threshold may be 0.9 milliamps when the load parameter is based on the current, and the load threshold may be 10 milliwatts when the load parameter is based on the power. For example, as discussed above, the power being below 10 milliwatts and/or the current being below 0.9 milliamps may indicate that the connector receiver module 339 may be faulty.

In block B408, the seat device 326 reports a maintenance indicator indicating a location of the seat device 326, the maintenance indicator being based on at least one of determining that the connector receiver module 339 is electrically connected to the connector or determining that the load parameter is below the load threshold. For example, as discussed above, the maintenance indicator may be reported to the onboard management system 344 such that the maintenance indicator may be displayed on display 347 along with its corresponding seat location.

In an aspect, the maintenance indicator includes one of a failure indicator indicating that the connector receiver module 339 is faulty and a warning indicator indicating presence of a potential issue with the connector receiver module 339. In this aspect, the reporting of the maintenance indicator in block B408 may include reporting the failure indicator when determining that the connector receiver module 339 is electrically connected to the connector and determining that the load parameter is below the load threshold, and reporting the warning indicator when determining that the connector receiver module 339 is electrically connected to the connector and determining that the load parameter is not below the load threshold. For example, as discussed above, the seat device 326 may report the failure indicator when the JACK DETECTION discrete is set to ground or active low (indicating the connector receiver module 339 being electrically connected to the connector) and the load parameter is below the load threshold, because the connector receiver module 339 is likely faulty when the load is low (e.g., below the load threshold) while the connector of the headset is plugged in the connector receiver module 339. In this case, a maintenance crew may need to replace the replaceable cassette 329 of the connector receiver module 339. If the connector of the headset is plugged in the connector receiver module 339 but the load is within a normal range (e.g., not below the load threshold), then it is possible that the connector of the headset is plugged in but the connector receiver module 339 is not faulty. In this case, for example, the warning indicator may be reported so that a maintenance crew may simply take out the connector of the headset from the connector receiver module 339.

In block B410, in an aspect, the seat device 326 may report the load parameter, wherein the load parameter is compared with a plurality of load parameters reported respectively from a plurality of seat devices. For example, as discussed above, the aircraft generally includes multiple seats with respective multiple seat devices, and thus the multiple seat devices may report their load parameters to the operation management system 344, so that the management system 344 may compare the load parameters to determine which seat device may need maintenance.

Accordingly, various aspects of the present disclosure provide innovative technology to efficiently check for failure or any warning signs of the connector receiver module 339. Instead of manually checking each seat device, maintenance indicators may be provided to the display 347 of the operation management system 344 to allow a maintenance crew to easily recognize which seat device needs attention for maintenance of a connector receiver module.

In one aspect innovative technology is provided for a method executed collectively by one or more processors (e.g., 332 executing module 370 and using data structure 368) of a media playback device (e.g., 326) of a transportation vehicle. The method includes determining (e.g., B402, FIG. 4A) whether a connector receiver module (e.g., 339) is electrically connected to a connector of a media output device during a maintenance mode; measuring (e.g., B404, FIG. 4A) a load parameter at the connector receiver module in response to determining that the connector receiver module is electrically connected to the connector, the load parameter being associated with an electrical load at the connector receiver module; determining (e.g., B406, FIG. 4A) whether the load parameter is below a load threshold (e.g., stored in data structure 468); and reporting (e.g., B408, FIG. 4A) a maintenance indicator (e.g., FIG. 3C) indicating a location of the media playback device, the maintenance indicator being based on at least one of determining that the connector receiver module is electrically connected to the connector or determining that the load parameter is below the load threshold.

Figure 4B:
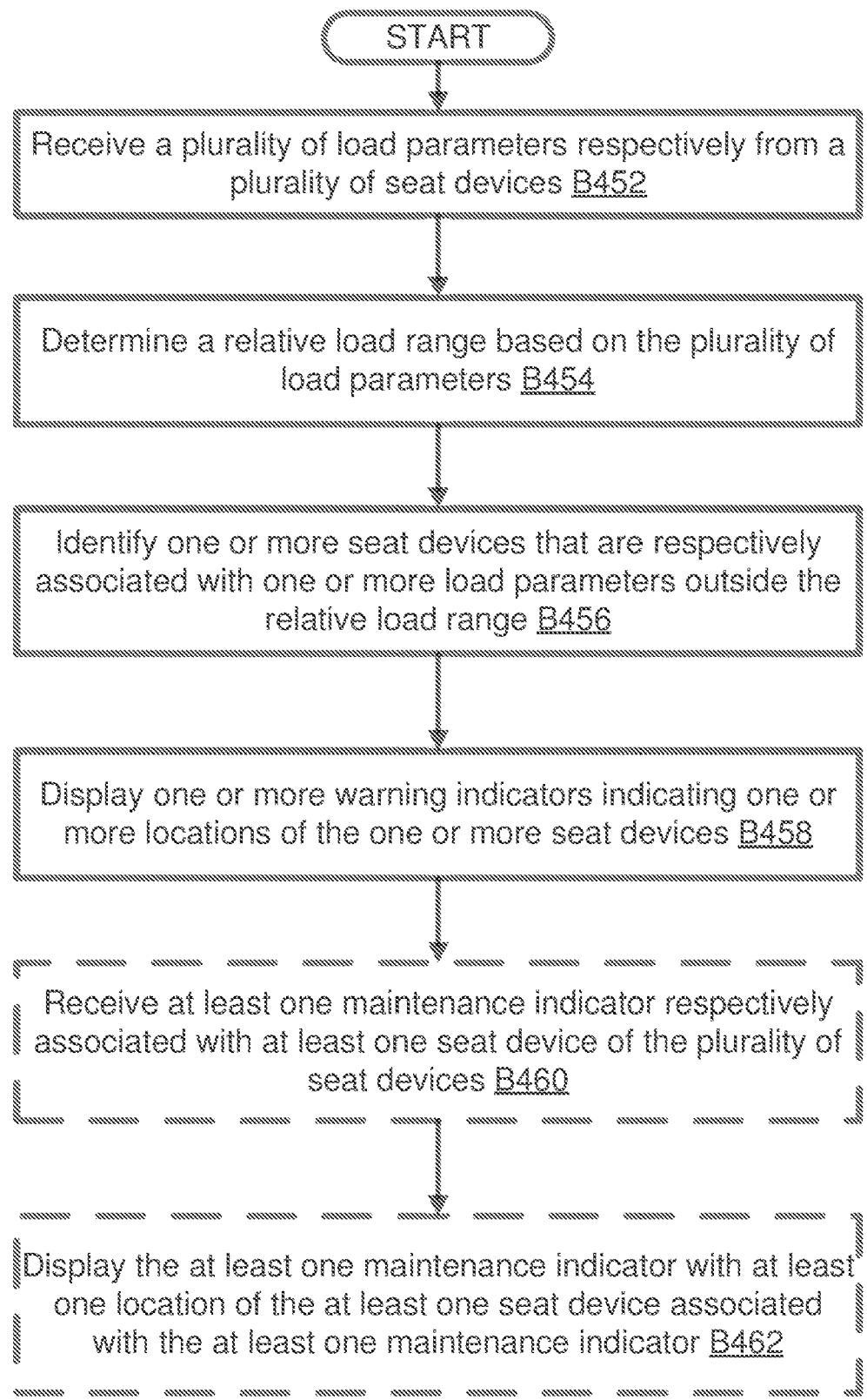
FIG. 4B shows a process flow diagram for detecting a failure in one or more connector receiver modules of a seat device of a transportation vehicle, according to one aspect of the present disclosure.

FIG. 4B shows process 450 for detecting a failure in one or more connector receiver modules in a seat device of a transportation vehicle (e.g., an aircraft), according to one aspect of the present disclosure. The seat device may be the seat device 326 of FIGS. 3A and 3B and may also be referred to as a seat device. Process 400 is executed by the headset detection module 370 configured to utilize headset data structure 368. As mentioned above, the headset detection module 370 may be executed in the server 354 of the onboard management system 344 and/or the seat device 326. As a preferred aspect, process 450 may be executed by the headset detection module 370 of the server 354 of the onboard management system 344.

Process 450 begins in block B452, the onboard management system 344 receives a plurality of load parameters respectively from a plurality of seat devices, each load parameter of the plurality of load parameters being associated with a respective electrical load at a respective seat device of the plurality of seat devices. In an aspect, the load parameter may be based on at least one of a current through the seat device or a power across the seat device. For example, as discussed above, each seat device may measure its own load parameter and report it to the onboard management system 344, so that the onboard management system 344 may analyze the load parameters from different seat devices. Each of the seat devices mentioned in FIG. 4B may have the features of the seat device 326.

In block B454, the onboard management system 344 determines a relative load range based on the plurality of load parameters. In an aspect, the relative load range based on the plurality of load parameters may be determined based on an average value of the plurality of load parameters. For example, as discussed above, the relative load range may be set to be a particular range near the average value of the load parameters reported by different seat devices.

In block B456, the onboard management system 344 identifies one or more seat devices of the plurality of seat devices, wherein the one or more seat devices identified are respectively associated with one or more load parameters outside the relative load range. For example, as discussed above, if a load parameter associated with a particular seat device falls outside of the relative load range, this may indicate that a seat device needs some attention by a maintenance crew.

In block B458, the onboard management system 344 displays one or more warning indicators indicating one or more locations of the one or more seat devices. The example of the warning indicator is illustrated in FIG. 3C. When a maintenance crew sees the warning indicator with a seat location, the maintenance may check the seat device at the seat location indicated by the warning indicator.

In block B460, in an aspect, the onboard management system 344 receives at least one maintenance indicator respectively associated with at least one seat device of the plurality of seat devices, wherein each maintenance indicator indicates a location of a respective seat device and is based on at least one of a connector receiver module of the respective seat device being electrically connected to a connector of a media output device or a load qparameter of the seat device being below a load threshold. In an aspect, each maintenance indicator includes one of a failure indicator indicating that the connector receiver module 339 of the respective seat device is faulty and a second warning indicator indicating presence of a potential issue with the connector receiver module 339 of the respective seat device. For example, as discussed above, each seat device may perform its own analysis of the conditions associated with a connector receiver module and may report a maintenance indicator if the connector receiver module is electrically connected to the connector of the media output device during the maintenance mode. The type of maintenance indicator may depend on whether the connector receiver module is electrically connected to the connector of the media output device and whether the load parameter of the seat device is below a load threshold.

In block B462, in an aspect, the onboard management system 344 may display the at least one maintenance indicator with at least one location of the at least one seat device associated with the at least one maintenance indicator. The example of the warning indicator is illustrated in FIG. 3C. When a maintenance crew sees a warning indicator with a seat location and/or a failure indicator with a seat location, the maintenance may check the seat device at the seat location.

Accordingly, some aspects of the present disclosure may provide innovative technology to efficiently detect a seat device with a load parameter value that is an outlier when compared with load parameters of other seat devices. By displaying an indicator indicating the location of such a seat device, a maintenance crew may easily identify which seat device needs to be checked.

In an aspect, the load parameter is based on at least one of a current through the seat device or a power across the seat device. In an aspect, the load threshold is 0.9 milliamps when the load parameter is based on the current, and the load threshold is 10 milliwatts when the load parameter is based on the power. For example, as discussed above, the power being below 10 milliwatts and/or the current being below 0.9 milliamps may indicate that the connector receiver module 339 may be faulty.

In one aspect, innovative technology is provided to execute a method by one or more processors (e.g., 346 executing module 370 and using data structure 468) of an aircraft management system (e.g., 344) connected to a plurality of media playback devices (e.g., 326) on the aircraft. The method includes receiving (e.g., B452, FIG. 4B) a plurality of load parameters respectively from a plurality of media playback devices, each load parameter of the plurality of load parameters being associated with a respective electrical load at a respective media playback device of the plurality of media playback devices; determining (e.g., B454, FIG. 4B) a relative load range based on the plurality of load parameters; identifying (e.g., B456, FIG. 4B) one or more media playback devices of the plurality of media playback devices, where the one or more media playback devices identified are respectively associated with one or more load parameters outside the relative load range; and displaying (B458, FIG. 4B) one or more warning indicators indicating one or more locations of the one or more media playback devices.

Figure 5:
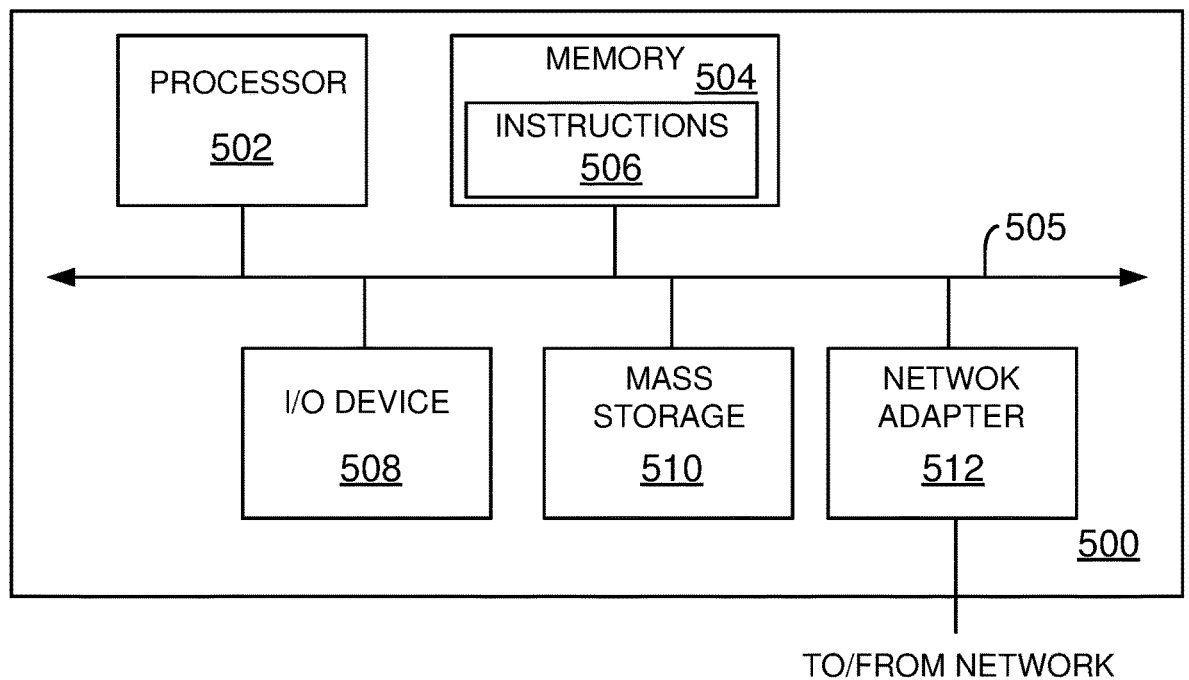
FIG. 5 shows a block diagram of a computing system, used according to one aspect of the present disclosure.

Processing System: FIG. 5 is a high-level block diagram showing an example of the architecture of a processing system 500 that may be used according to one aspect. The processing system 500 can represent CMD 360, media server 112, computing system 106/107, WAP 130, onboard management system 344, seat device 326 or any user device (PED 302) that attempts to interface with a vehicle computing device. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random-access memory (RAM), read-only memory (ROM), flash memory, or the like, or a combination of such devices. Memory 504 includes the main memory of the processing system 500. Instructions 506 may be used to the process steps of FIG. 4A-4B executed by module 370, CMI 320 as well as the data structure 368, described above.

Also connected to the processors 502 through the bus system 505 are one or more internal mass storage devices 510, and a network adapter 512. Internal mass storage devices 510 may be or may include any conventional medium for storing large volumes of data in a non-volatile manner, such as one or more magnetic or optical based disks, flash memory, or solid-state drive.

The network adapter 512 provides the processing system 500 with the ability to communicate with remote devices (e.g., over a network) and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for detecting failed connector modules are provided. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method executed collectively by one or more processors of a media playback device of a transportation vehicle, comprising:
   determining whether a connector receiver module is electrically connected to a connector of a media output device during a maintenance mode;
   measuring a load parameter at the connector receiver module in response to determining that the connector receiver module is electrically connected to the connector, the load parameter being associated with an electrical load at the connector receiver module;
   determining whether the load parameter is below a load threshold; and
   reporting a maintenance indicator indicating a location of the media playback device, the maintenance indicator being based on at least one of determining that the connector receiver module is electrically connected to the connector or determining that the load parameter is below the load threshold.

2. The method of claim 1, wherein the determining whether the connector receiver module is electrically connected to the connector comprises:
   determining whether a jack detection pin at the media playback device is set to a ground, the connector receiver module being configured to set the jack detection pin to the ground in response to the connector receiver module being electrically coupled to a connecting pin of the connector.

3. The method of claim 1, wherein the maintenance indicator includes one of a failure indicator indicating that the connector receiver module is faulty and a warning indicator indicating presence of a potential issue with the connector receiver module.

4. The method of claim 3, wherein the reporting the maintenance indicator comprises:
   reporting the failure indicator in response to determining that the connector receiver module is electrically connected to the connector and determining that the load parameter is below the load threshold; and
   reporting the warning indicator in response to determining that the connector receiver module is electrically connected to the connector and determining that the load parameter is not below the load threshold.

5. The method of claim 1, wherein the load parameter is based on at least one of a current through the media playback device or a power across the media playback device.

6. The method of claim 5, wherein the load threshold is 0.9 milliamps when the load parameter is based on the current, and the load threshold is 10 milliwatts when the load parameter is based on the power.

7. The method of claim 1, further comprising:
   reporting the load parameter, wherein the load parameter is compared with a plurality of load parameters reported respectively from a plurality of media playback devices.

8. A method executed collectively by one or more processors of an aircraft management system connected to a plurality of media playback devices on the aircraft, comprising:
   receiving a plurality of load parameters respectively from a plurality of media playback devices, each load parameter of the plurality of load parameters being associated with a respective electrical load at a respective media playback device of the plurality of media playback devices;
   determining a relative load range based on the plurality of load parameters;
   identifying one or more media playback devices of the plurality of media playback devices, wherein the one or more media playback devices identified are respectively associated with one or more load parameters outside the relative load range; and
   displaying one or more warning indicators indicating one or more locations of the one or more media playback devices.

9. The method of claim 8, wherein the relative load range based on the plurality of load parameters is determined based on an average value of the plurality of load parameters.

10. The method of claim 8, wherein the load parameter is based on at least one of a current through the media playback device or a power across the media playback device.

11. The method of claim 8, further comprising:
    receiving at least one maintenance indicator respectively associated with at least one media playback device of the plurality of media playback devices, wherein each maintenance indicator indicates a location of a respective media playback device and is based on at least one of a connector receiver module of the respective media playback device being electrically connected to a connector of a media output device or a load parameter of the media playback device being below a load threshold; and
    displaying the at least one maintenance indicator with at least one location of the at least one media playback device associated with the at least one maintenance indicator.

12. The method of claim 11, wherein each maintenance indicator includes one of a failure indicator indicating that the connector receiver module of the respective media playback device is faulty and a second warning indicator indicating presence of a potential issue with the connector receiver module of the respective media playback device.

13. The method of claim 11, wherein the load parameter is based on at least one of a current through the media playback device or a power across the media playback device.

14. The method of claim 13, wherein the load threshold is 0.9 milliamps when the load parameter is based on the current, and the load threshold is 10 milliwatts when the load parameter is based on the power.

15. A non-transitory machine-readable storage medium having stored thereon instructions for performing a method, comprising machine executable code which when executed by at least one machine, causes the machine to:
    determine whether a connector receiver module is electrically connected to a connector of a media output device during a maintenance mode;
    measure a load parameter at the connector receiver module in response to determining that the connector receiver module is electrically connected to the connector, the load parameter being associated with an electrical load at the connector receiver module;
    determine whether the load parameter is below a load threshold; and
    report a maintenance indicator indicating a location of the media playback device, the maintenance indicator being based on at least one of determining that the connector receiver module is electrically connected to the connector or determining that the load parameter is below the load threshold.

16. The non-transitory machine-readable storage medium of claim 15, wherein the machine executable code causing the machine to determine whether the connector receiver module is electrically connected to the connector causes the machine to:
    determine whether a jack detection pin at the media playback device is set to a ground, the connector receiver module being configured to set the jack detection pin to the ground in response to the connector receiver module being electrically coupled to a connecting pin of the connector.

17. The non-transitory machine-readable storage medium of claim 15, wherein the maintenance indicator includes one of a failure indicator indicating that the connector receiver module is faulty and a warning indicator indicating presence of a potential issue with the connector receiver module.

18. The non-transitory machine-readable storage medium of claim 17, wherein the machine executable code causing the machine to report the maintenance indicator causes the machine to:
    report the failure indicator in response to determining that the connector receiver module is electrically connected to the connector and determining that the load parameter is below the load threshold; and
    report the warning indicator in response to determining that the connector receiver module is electrically connected to the connector and determining that the load parameter is not below the load threshold.

19. The non-transitory machine-readable storage medium of claim 16, wherein the load parameter is based on at least one of a current through the media playback device or a power across the media playback device.

20. The non-transitory machine-readable storage medium of claim 19, wherein the load threshold is 0.9 milliamps when the load parameter is based on the current, and the load threshold is 10 milliwatts when the load parameter is based on the power.

* * * * *